United States Patent
Chantrasuwan et al.

(10) Patent No.: US 6,662,894 B2
(45) Date of Patent: Dec. 16, 2003

(54) AUTOMOTIVE BRAKE/CLUTCH LOCK

(76) Inventors: Watchara Chantrasuwan, 55/35 Moo7, SOI Nuanchan Navamin Road, Buengkoom, Bangkok (TH), 10230; Suwat Petcharapirat, 555 Moo1 Petchkasem Road, Nongtatam, Pranburi, Pracuabkirikhan (TH), 77120

( * ) Notice: Subject to any disclaimer, the term of this patent is extended or adjusted under 35 U.S.C. 154(b) by 38 days.

(21) Appl. No.: 10/040,048

(22) Filed: Oct. 29, 2001

(65) Prior Publication Data

US 2003/0079930 A1 May 1, 2003

(30) Foreign Application Priority Data

Jun. 15, 2001 (TH) ........................................ 0103000295

(51) Int. Cl.$^7$ .............................................. B60R 25/00
(52) U.S. Cl. ............................ 180/287; 70/199; 70/202; 70/237
(58) Field of Search ........................... 180/287; 70/199, 70/200, 202, 203, 237, 238

(56) References Cited

U.S. PATENT DOCUMENTS

| | | |
|---|---|---|
| 1,366,992 A | 2/1921 | Winchell |
| 1,494,219 A | 5/1924 | Cynamon ..................... 70/199 |
| 2,330,536 A | 9/1943 | Zimmerman ................. 70/199 |
| 2,336,829 A | 12/1943 | Zimmerman et al. ......... 70/199 |
| 3,719,063 A * | 3/1973 | Fouces et al. ................ 70/202 |
| 4,615,192 A | 10/1986 | Brown .......................... 70/181 |
| 5,870,912 A | 2/1999 | Vito .............................. 70/202 |
| 5,881,587 A | 3/1999 | Vito .............................. 70/202 |
| 5,979,197 A | 11/1999 | Mellini et al. ................ 70/199 |
| 6,089,055 A | 7/2000 | Vito .............................. 70/202 |
| 6,192,724 B1 | 2/2001 | Vito .............................. 70/202 |
| 6,298,696 B2 | 10/2001 | Vito .............................. 70/202 |
| 6,439,005 B1 * | 8/2002 | Thompson .................... 70/202 |
| 2001/0005997 A1 | 7/2001 | Vito .............................. 70/202 |

FOREIGN PATENT DOCUMENTS

| | | | |
|---|---|---|---|
| GB | 1097889 | 1/1968 | |
| GB | 2324285 A * | 10/1998 | ........... B60R/25/00 |
| TH | 10218 | 3/2001 | |

* cited by examiner

Primary Examiner—Peter C. English
(74) Attorney, Agent, or Firm—Van Dyke, Gardner, Linn & Burkhart, LLP

(57) ABSTRACT

A pedal locking device for locking and securing a brake and/or clutch pedal of a vehicle includes a dual locking mechanism. The dual locking mechanism provides a first locking mechanism which is movable to engage a locking bracket with the pedals and a second locking mechanism which is actuatable to lock the first locking mechanism in its locked position. The locking device is adjustably mounted to a steering column of the vehicle and is adapted for use with different vehicles, without requiring any alteration of the length of the locking device.

36 Claims, 6 Drawing Sheets

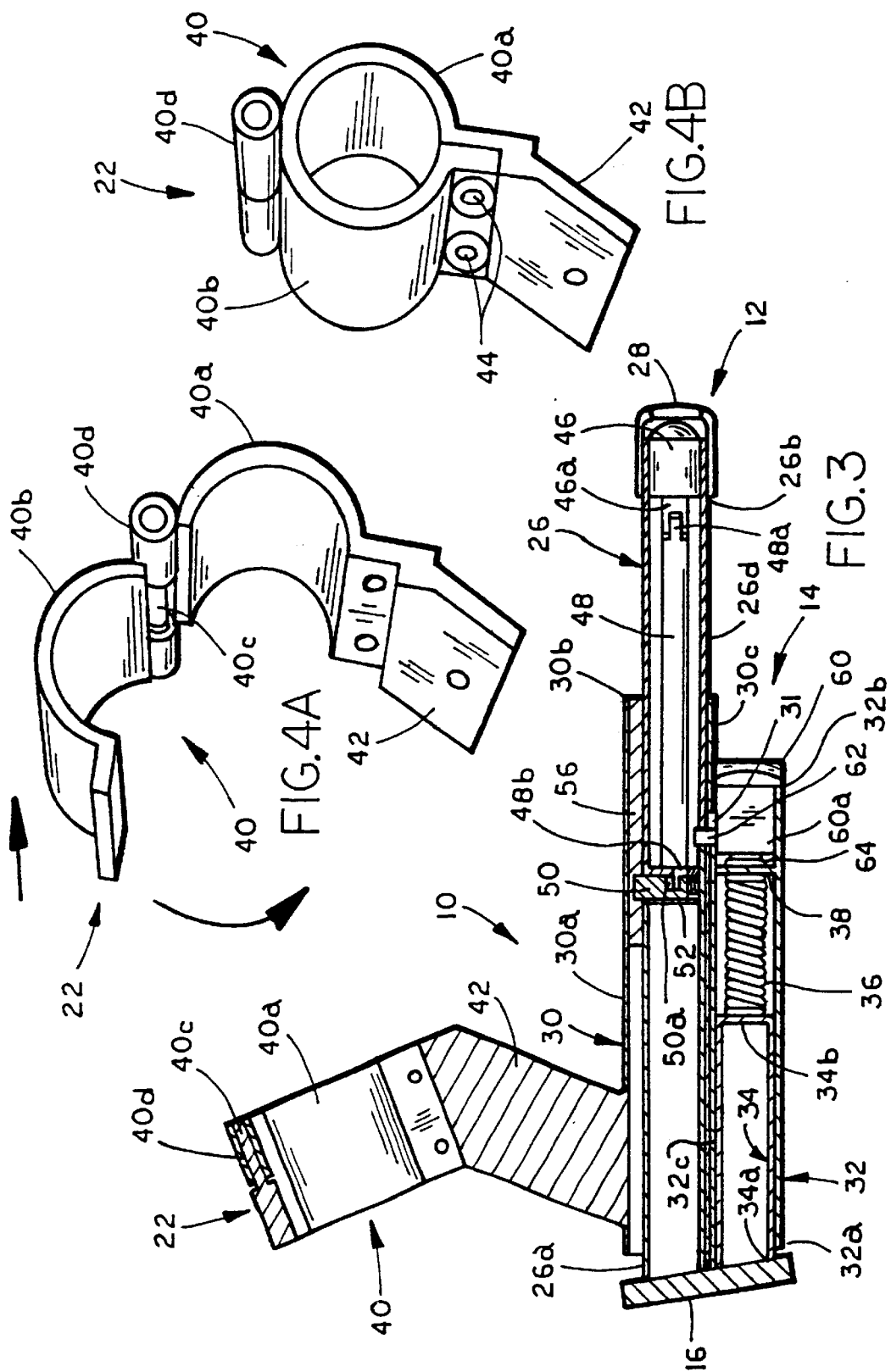

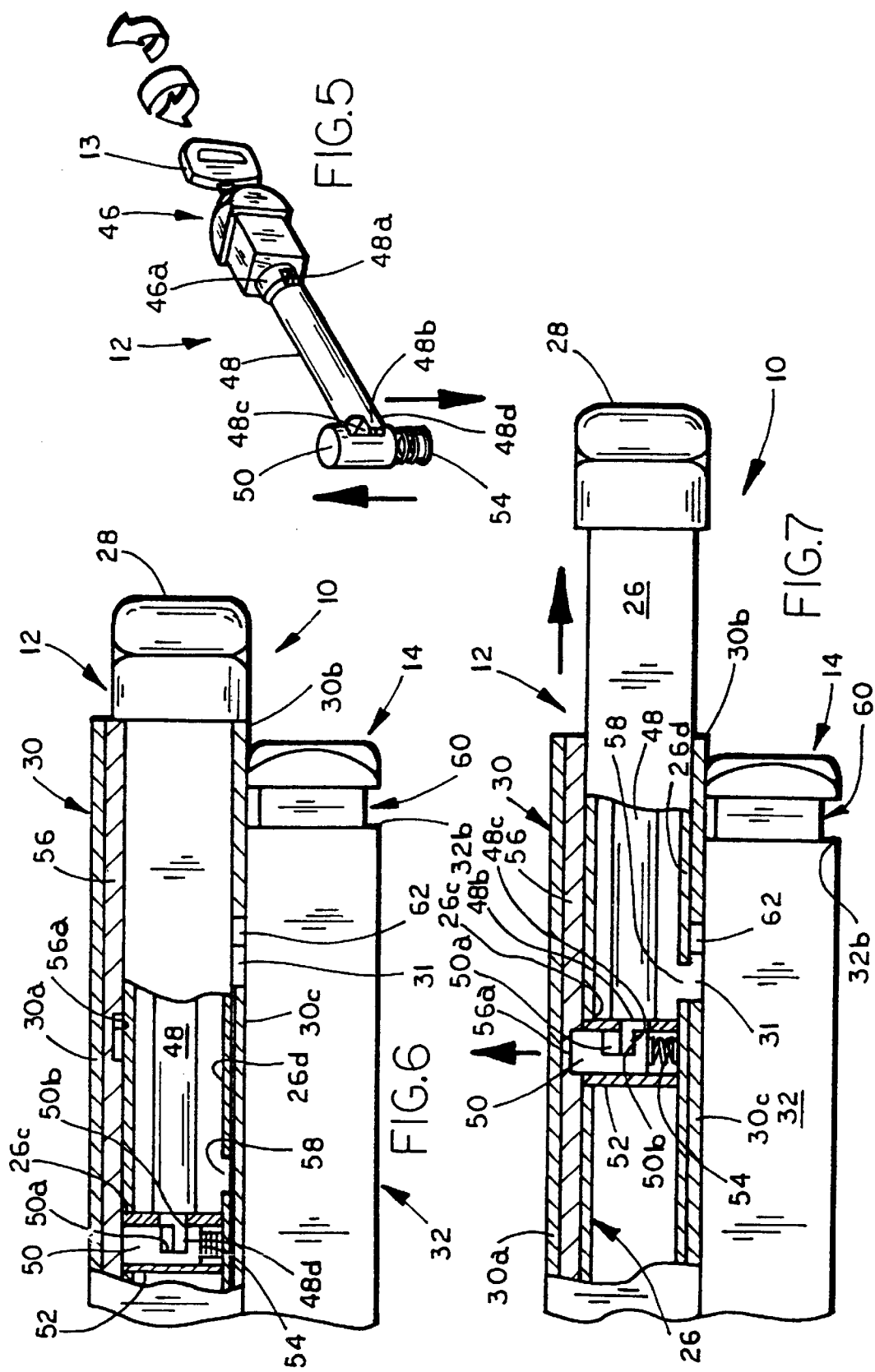

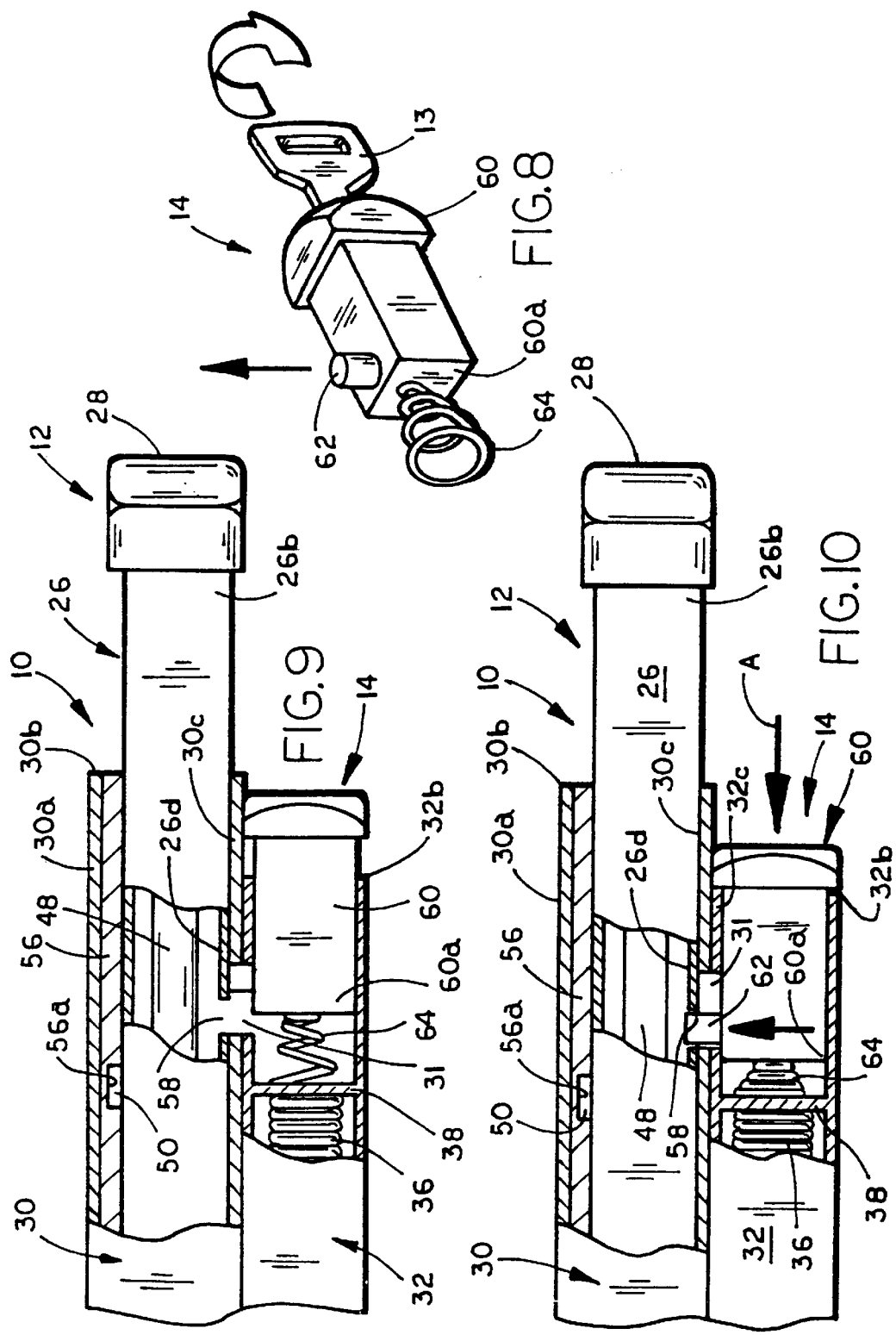

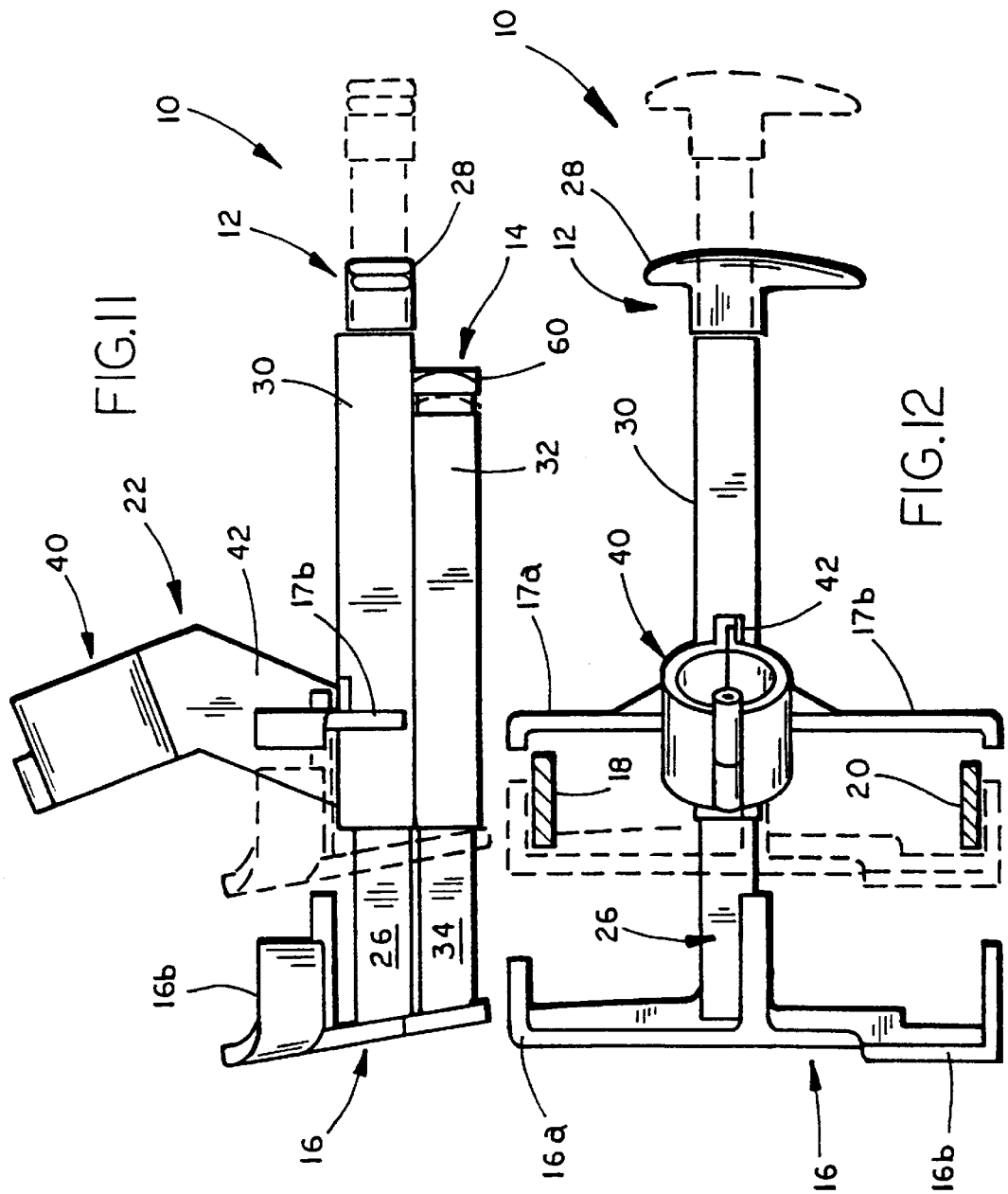

AUTOMOTIVE BRAKE/CLUTCH LOCK

FIELD OF THE INVENTION

The present invention relates generally to a locking device for securing the brake and/or clutch pedals of a vehicle to restrict movement of the pedals to prevent theft of the vehicle and, more particularly, to a locking device which has a dual locking mechanism to further enhance the performance of the locking device.

BACKGROUND OF THE INVENTION

Various locking devices have been proposed which lock a brake and/or clutch pedal of a vehicle to prevent movement of the pedals and, thus, substantially preclude theft of the vehicle, even if a potential thief is able to start the engine of the vehicle. Such locking devices provide a single locking mechanism to secure the pedals in a locked position. The locking devices do not provide a secondary locking mechanism to further limit or preclude the possibility that a potential thief may pick or break the locking mechanism.

Some double locking mechanisms have been proposed which include a second locking device to further limit or preclude the possibility of theft of the vehicle. The second lock is typically a padlock which is inserted through a pair of aligned openings in the locking mechanism when the locking mechanism is locked in position at the pedal or pedals. An example of such a locking device is shown in Thailand Patent Certificate No. 10218, dated Mar. 14, 2001. It is, therefore, inconvenient to lock and unlock the second locking mechanism, since it requires inserting and removing a secondary lock to the locking device. Additionally, such double locking mechanisms are non-adjustable and thus must be made in various lengths, such that a locking device of an appropriate length must be selected for a particular vehicle or type of vehicle. Also, such double locking mechanisms typically include complicated components which are difficult to manufacture, thus leading to increased costs of the locking devices.

SUMMARY OF THE INVENTION

The present invention is intended to provide a simplified and adjustable double locking device for limiting movement of the brake and/or clutch pedals of a vehicle when locked thereto. The double locking device of the present invention includes two separate key locks for locking and unlocking the locking device and, thus, the pedals. The locking device is adjustable so it may be easily adapted for use on various vehicles.

According to an aspect of the present invention, a locking device suitable for securing at least one pedal of a vehicle in a non-operable state includes a pedal engaging member adaptable to engage the pedal of the vehicle, a first locking mechanism, a second locking mechanism and a mounting member for mounting the locking device to a steering column of the vehicle. The first locking mechanism is movable between a first position, where the pedal engaging member is disengaged from the pedal, and a second position, where the pedal engaging member is engaged with the pedal, such that the pedal is secured in a non-operable slate when the first locking mechanism is in the second position. The second locking mechanism is operable to secure the first locking mechanism in the second position. The mounting member is configured to be adjustably positioned along the steering column of the vehicle to position the locking device such that the pedal engaging member is positioned remote from the pedal when the first locking mechanism is in the first position.

In one form, the mounting member includes a collar member which is closeable around the steering column to secure the locking device to the steering column. The locking device preferably includes a biasing member to bias the pedal engaging member toward its disengaged position.

According to another aspect of the present invention, a locking device suitable for securing at least one pedal of a vehicle in a non-operable state includes a pedal engaging member adaptable to engage at least one pedal of the vehicle, a first locking mechanism, a second locking mechanism and a mounting member for mounting the locking device to the vehicle. The first locking mechanism includes an outer shaft and an inner shaft slidable within the outer shaft. The inner shaft is secured to the pedal engaging member and is movable between a first position, where the pedal engaging member is disengaged from the pedal, and a second position, where the pedal engaging member is engaged with the pedal. The first locking mechanism includes a first locking ember which is movable to secure the inner shaft relative to the outer shaft when the inner shaft is in the second position. The inner shaft has an inner opening through a wall of the inner shaft and the outer shaft has an outer opening through a wall of the outer shaft, whereby the inner and outer openings are generally alignable with one another when the inner shaft is positioned in the second position. The second locking mechanism is operable to secure the inner shaft in the second position irrespective of the position of the first locking member. The second locking mechanism includes a second locking member which is positionable at least partially through the outer opening in the outer shaft and the inner opening in the inner shaft when the inner shaft is in the second position. The mounting member is configured to mount the locking device to the vehicle to substantially limit movement of the outer shaft relative to the vehicle.

Preferably, the first locking member is biased toward a locking position and is movable to an unlocking position in response to rotation of a rotatable shaft positioned within the inner shaft of the first locking mechanism The rotatable shaft preferably includes a cammed engaging portion which engages a notch in the first locking member such that rotation of the rotatable shaft causes a corresponding translational movement of the first locking member. Rotation of the rotatable shaft may be in response to rotation of a first key at the first locking mechanism.

The second locking mechanism is preferably movable relative to the outer shaft to align the second locking member with the inner opening when the inner shaft is in its second position. The second locking member is biased toward the inner opening such that movement of the second locking mechanism to align the second locking member with the inner opening results in the second locking member moving to be positioned at least partially through the inner opening. The second locking member may be movable to retract from the inner opening in response to rotation of a second key at the second locking mechanism.

These and other objects, advantages, purposes and features of this invention will become apparent upon review of the following specification in conjunction with the drawings.

BRIEF DESCRIPTION OF THE DRAWINGS

FIG. 3 is a sectional view taken along the line III—III in FIG. 1;

FIGS. 4A and 4B are perspective views of a mounting collar useful with the present invention;

FIG. 5 is a perspective view of a first locking mechanism in accordance with the present invention;

FIG. 6 is a partial sectional view of the locking device of the present invention, with the first locking mechanism in its unlocked position, with portions removed to show the first locking mechanism of FIG. 5;

FIG. 7 is a partial sectional view of the locking device of the present invention similar to FIG. 6, with the first locking mechanism in its locked position;

FIG. 8 is a perspective view of a second locking mechanism in accordance with the present invention;

FIG. 9 is a partial sectional view of the locking device of the present invention, with the second locking mechanism in its unlocked position, with portions removed to show the second locking mechanism of FIG. 8;

FIG. 10 is a partial sectional view similar to FIG. 9, with the second locking mechanism in its locked position;

FIG. 11 is a side elevation of the locking device of the present invention; and

FIG. 12 is a top plan view of the locking device of FIG. 11.

DESCRIPTION OF THE PREFERRED EMBODIMENTS

Figure 1:
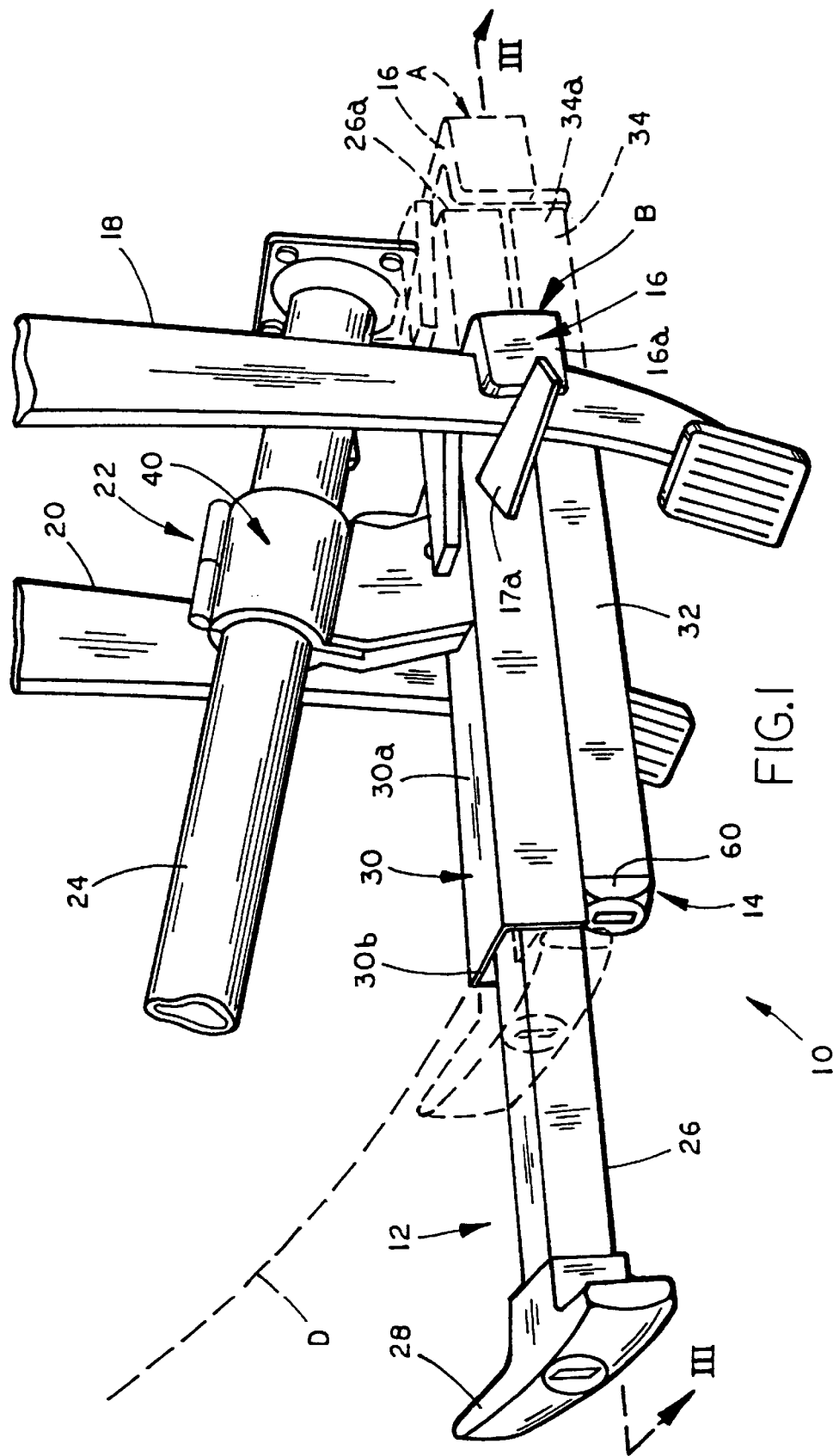
FIG. 1 is a perspective view of a locking device in accordance with the present invention, as mounted to a steering column of a vehicle.

Referring now to the drawings and the illustrative embodiments depicted therein, a pedal locking device 10 includes a first locking mechanism 12 and a second locking mechanism 14 (FIG. 1). Locking device 10 includes a pedal bracket 16, which is movable to engage and restrain or secure a brake pedal 18 and/or a clutch pedal 20 of a vehicle in which locking device 10 is installed. Locking device 10 further includes a mounting bracket 22, which may be positioned at and secured to a steering column 24 of the vehicle, in order to mount and secure locking device 10 to the vehicle at an appropriate position.

First locking mechanism 12 includes an elongated inner shaft or tube member 26, which has a T-handle 28 at one end 26b and the pedal bracket 16 welded or otherwise secured at the other end 26a. When T-handle 28 is pulled, inner shaft 26 slides outwardly from a first outer elongated shaft or tube member 30 and moves the pedal bracket 16 from a disengaged position (as shown in phantom at A in FIG. 1) to an engaged position (as shown with the solid lines at B in FIG. 1), to engage the pedal or pedals of the vehicle to prevent use of the pedals and thus to secure the vehicle.

Second locking mechanism 14 functions to further secure locking device 10 at the pedals 18, 20 to further limit or substantially preclude theft of the vehicle. The second locking mechanism 14 is mounted at an end of a second outer elongated shaft or tube member 32, which is generally parallel and adjacent to the first elongated outer shaft 30. Outer elongated shaft 32 includes an inner elongated shaft or tube member 34 extending from one end 32a, which is also welded or otherwise secured to the pedal bracket 16 and is slidable within outer shaft 32 between the engaged and disengaged position, similar to inner shaft 26 of first locking mechanism 12, discussed above. A biasing member 36 (FIG. 2) is positioned within outer shaft 32 and between an inner end 34b of inner shaft 34 and a stop plate or bracket 38 welded or otherwise positioned within outer shaft 32. Biasing member 36 functions to bias inner shaft 34 toward its outward or extended position, in order to bias pedal bracket 16 towards it disengaged position A (FIG. 1), where the pedal bracket 16 is remote from the pedals 18, 20.

As best shown in FIGS. 1, 2, 11 and 12, pedal bracket 16 includes a pair of arms 16a, 16b extending laterally outward from a center portion 16c, which is welded or otherwise secured to the ends 26a and 34a of inner shafts 26 and 34, respectively. The laterally extending arms 16a, 16b include curved ends, such that the pedal bracket 16 defines a pair of generally U-shaped arms for engaging and retaining the pedals 18 and 20 therewithin. The curved ends prevent lateral movement of the pedals to unhook them from the locking device 10 and thus assist in preventing use of the pedals when locking device 10 is in its locked position. A pair of laterally extending wings or brackets 17a, 17b are preferably positioned along outer shaft 30 and/or 32 and may provide an oppositely turned end portion (as best shown in FIG. 12), such that the corresponding arms and wings 16a, 17a and 16b, 17b, function to substantially surround and thus preclude movement of the pedals 18, 20, respectively, when locking device 10 is in its locked orientation (as shown in phantom in FIGS. 11 and 12). The locking device 10 is secured in this position via pulling out the T-handle 28 a sufficient amount and pushing in locking mechanism 14 into outer shaft 32 (as also shown in phantom in FIGS. 11 and 12), as discussed below.

As best shown in FIGS. 1, 2, 4A and 4B, mounting bracket 22 includes a hinged collar portion 40 formed at an outer end of a mounting leg 42, which is welded or otherwise secured to an upper portion of outer shaft 30. Hinged collar portion 40 includes a pair of half-collar members 40a, 40b, which are pivotally connected via a pivot pin 40c inserted within a guide bushing 40d at one or both collar portions 40a, 40b. Collar members 40a, 40b are pivotable between an open position (FIG. 4A) for positioning the collar portion 40 along the steering column, and a closed position (FIG. 4B) for closing and clamping around the steering column to secure locking device 10 in an appropriate position along the steering column.

Figure 2:
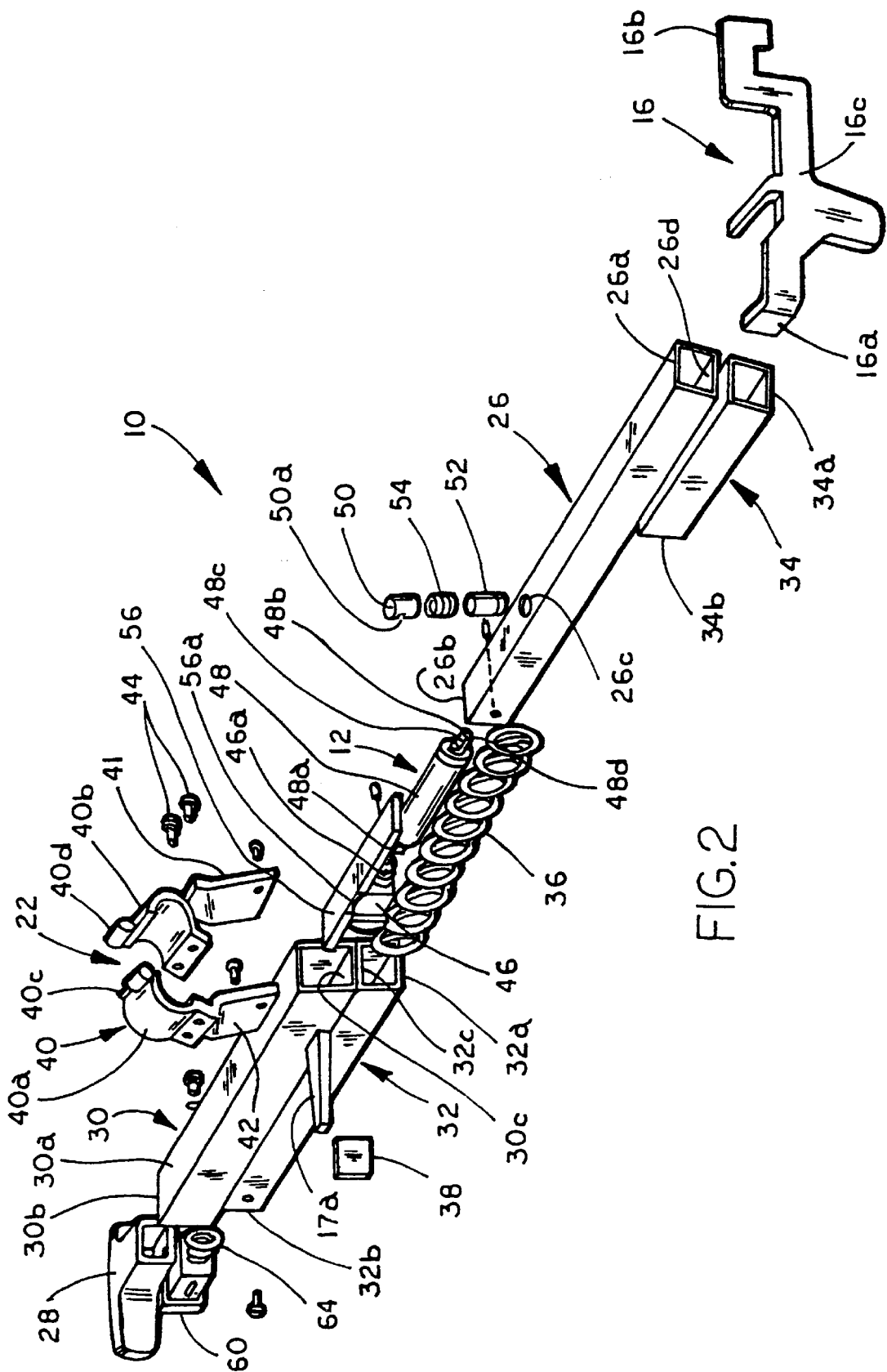
FIG. 2 is a perspective exploded view of the locking device shown in FIG. 1.

As shown in FIGS. 2 and 4B, collar portion 40 is secured in its closed position via a pair of setscrews or other fastening means 44 to secure the collar portion 40 in its closed position tightly around the steering column 24 of the vehicle. After the collar portion 40 has been tightly secured about the steering column via fastening means 44, a cover plate 41 may be secured to mounting leg 42, in order to further secure collar portion 40 in its closed position to maintain tight clamping on the steering column of the vehicle.

In the illustrated embodiment, mounting leg 42 of mounting bracket 22 is welded or otherwise secured to an upper wall 30a of outer shaft 30. Outer shafts 30 and 32 are also welded or otherwise secured together such that outer shaft 30 and first locking mechanism 12 are positioned above outer shaft 32 and second locking mechanism 14. As shown in FIG. 1, when mounting bracket 22 is properly mounted along the steering column 24 of the vehicle, outer ends 30b and 32b of outer shafts 30 and 32, respectively, are positioned generally at or forward of an edge of the dashboard (shown generally at D in FIG. 1). The present invention thus is substantially out of the way and does not interfere with a driver driving the vehicle when the locking device is unlocked. The outer shaft and inner shafts are shown as having a generally square cross section, which allows the outer shafts 30, 32 to mate together along their adjacent walls 30c, 32c, respectively. As best shown in FIGS. 9 and 10, the adjacent walls 30c and 32c of outer shafts 30 and 32, respectively, include an opening or passageway 31 therethrough for receiving a lock pin 62 of second locking mechanism 14, as discussed below.

Although shown and described as having a square outer shaft 30 on top of a square outer shaft 32, the orientation of the shafts relative to one another and the shape of the shafts are not critical to the present invention. It is envisioned that the first locking mechanism 12 may be positioned beneath the second locking mechanism 14 or the locking mechanisms may be positioned side by side one anther, without affecting the scope of the present invention. Additionally, although shown as generally square or rectangular tubes or shafts, the inner and outer shafts of the locking device of the present invention may be other forms, such as generally cylindrical tubes or shafts or the like, without affecting the scope of the present invention.

Referring now to FIGS. 1–3 and 5–7, first locking mechanism 12 includes a lock cylinder 46, which is positioned within T-handle 28 at end 26b of inner shaft 26. Second locking mechanism 12 further includes a rotatable shaft 48 which is connected between lock cylinder 46 and a movable lock pin 50. Rotatable shaft 48 includes an engaging portion 48a, which extends from one end of rotatable shaft 48 and engages a corresponding engaging portion 46a of a lock mechanism (not shown) within lock cylinder 46, such that rotation of a key 13 in the lock mechanism causes a corresponding rotation of engaging portion 46a and thus of rotable shaft 48.

Rotatable shaft 48 also includes a half circular or cammed engaging portion 48b, which extends from an opposite end of rotatable shaft 48 from engaging portion 48a. Engaging portion 48b engages a notch 50a in lock pin 50, as best seen in FIGS. 3, 6 and 7, which is slidable within a cylindrical guide 52 secured within inner shaft 26. Inner shaft 26 further includes a circular opening or aperture 26c at an end of lock pin 50 to allow for insertion of cylindrical guide 52 and lock pin 50 into inner shaft 26. Cammed engaging portion 48b of rotatable shaft 48 includes a generally flat surface 48c generally along its diameter or center line and a curved or cammed surface 48d, which engages a surface 50b of a notch 50a in lock pin 50, in order to cause movement of lock pin 50 when rotatable shaft is rotated. A biasing member or spring 54 is further included within cylindrical guide 52, to bias lock pin 50 outwardly from inner shaft 26 and toward a lock plate 56, which is welded or otherwise secured along one of the walls, such as upper wall 30a of outer shaft 30. As best seen in FIG. 2, lock plate 56 is a generally rectangular plate and includes a notched or recessed portion 56a along one side for receiving lock pin 50 therein when first locking mechanism 12 is moved to its locking position, as discussed below.

As shown in FIG. 5, turning key 13 in one direction causes rotation of the locking mechanism within lock cylinder 46, which further causes rotation of engaging portion 46a and thus of rotatable shaft 48. As rotatable shaft 48 rotates, the half cylindrical engaging portion or extension 48b rotates within notched portion 50a of lock pin 50. The half cylindrical shape of engaging portion 48b functions to move lock pin 50 towards its disengaged position, or in the downward position, as shown in FIG. 6, when the rounded or cammed surface 48d of engaging portion 48b contacts surface 50b of notched portion 50a of lock pin 50, thereby pushing lock pin 50 away from lock plate 56 and compressing biasing member 54. Rotation of the key 13 in the opposite direction again causes rotation of engaging portion 48b within notched portion 50a, whereby the flat surface 48c of engaging portion 48b allows lock pin 50 to extend outwardly due to the force exerted by biasing member 54, as the flat surface 48c is moved to face surface 50b of notched portion 50a of lock pin 50. Although turning the key in this manner allows lock pin 50 to extend outwardly due to biasing member 54 to lock locking mechanism 12 in its locked position, lock pin 50 cannot extend outwardly until inner shaft 26 is moved along outer shaft 30 to align lock pin 50 with recessed portion 56a of lock plate 56, as can be seen in FIGS. 6 and 7.

Accordingly, locking device 10 may be actuated by turning the key 13 to its locking position, whereby the flat surface 48c of engaging portion 48b is facing toward surface 50b within notched portion 50a of lock pin 50. T-handle 28 may then be pulled outwardly to pull inner shaft 26 along outer shaft 30 until locking pin 50 is aligned with recess 56a in lock plate 56. When such alignment occurs, biasing member 54 functions to extend locking pin 50 outward from cylindrical guide 52 in inner shaft 26 to engage recess 56a in lock plate 56, thereby locking inner shaft 26 and pedal bracket 16 in position. Mounting bracket 22 is positioned along the steering column 24, such that this locked position corresponds to the appropriate position with respect to the pedals 18, 20, such that the pedals are substantially locked in place by pedal bracket 16 and corresponding pedal brackets 17a, 17b on outer shaft 30 or 32. As show in FIG. 7, when T-handle 28 and inner shaft 26 are moved to this locking position, an opening 58 in one wall 26d of inner shaft 26 is generally aligned with opening or passageway 31 in adjacent walls 30c and 32c of outer shafts 30 and 32, respectively.

Referring now to FIGS. 8–10, second locking mechanism 14 includes a lock cylinder 60, which is operable to extend and retract a lock pin 62. Locking mechanism 14 further includes a biasing member 64, which is mounted at an inner end 60a of lock cylinder 60, and engages inner plate 38 of outer shaft 32. As shown generally in FIG. 8, rotation of key 13 within lock cylinder 60 causes extension of lock pin 62 for locking second locking mechanism 14 in its locked state, as discussed below. Locking pin 62 may be biased, such as via a spring or other biasing means (not shown), towards its extended position, such that rotation of key 13 functions to retract lock pin 62 to unlock locking mechanism 14. Removal of key 13 would then allow the pin 62 to move or be biased toward its extended position, in order to lock second locking mechanism 14 in its locked orientation, as discussed below.

As shown in FIG. 9, second locking mechanism 14 is positioned within outer shaft 32, such that lock cylinder 60 extends partially outwardly from outer end 32b of outer shaft 32. Inner end 60a of lock cylinder 60 is inserted within outer shaft 32, such that biasing member 64 is positioned between stop plate 38 and inner end 60a of lock cylinder. In its unlocked position, as shown in FIG. 9, lock pin 62 extends partially outwardly from lock cylinder 60 and is received within opening 31 through outer shafts 30 and 32, and cannot extend further due to its contact with wall 26d of inner shaft 26.

As shown in FIGS. 9 and 10, when first locking mechanism 12 is in its locked position, inner shaft 26 extends outwardly from outer shaft 30 such that opening 58 in inner shaft 26 is aligned with opening or passageway 31 in outer shafts 30 and 32. Lock cylinder 60 may then be depressed inwardly toward outer shaft 32 (in the direction of arrow A in FIG. 10), such that lock cylinder 60 moves inwardly and compresses biasing member 64 against stop wall 38. When lock cylinder 60 has been depressed a sufficient amount, lock pin 62 is aligned with opening 58 and extends outwardly and at least partially through opening 58 in inner shaft 26, as shown in FIG. 10. Once lock pin 62 has been received through opening 58 in inner shaft 26, lock pin 62 functions to prevent movement of inner shaft 26 relative to outer shafts 30 and 32, irrespective of a position of lock pin 50 of first locking mechanism 12, such that locking device 10 is prevented from being unlocked.

Accordingly, when both locking mechanisms 12 and 14 are locked, pedal bracket 16 is secured in place at the pedals 18 and 20 of the vehicle, such that the pedals cannot be moved toward their depressed position by an operator of the vehicle. In order to unlock locking device 10, and thus to release the pedals to allow use of the vehicle, both locking mechanisms 12 and 14 must be unlocked. To release second locking mechanism 14, key 13 is inserted and rotated within lock cylinder 60 to at least partially retract lock pin 62, in order to move lock pin 62 out of opening 58 in inner shaft 26. Once lock pin 62 has been retracted a sufficient amount, biasing member 64 functions to push lock cylinder 60 outward from within outer shaft 32, such that lock pin 62 is moved away from opening 58, as shown in FIG. 9.

Once the second locking mechanism 14 has been unlocked, first locking mechanism 12 is unlocked via turning of key 13 within lock cylinder 46 to cause rotation of rotatable shaft 48. As rotatable shaft 48 rotates, the curved or cammed surface 48d of extension 48b engages the surface 50b of lock pin 50 and pushes or moves lock pin 50 against biasing member 54 to its retracted position, such that lock pin 50 is removed from the recessed portion 56a of lock plate 56. Once lock pin 50 has been removed from recess portion 56a of lock plate 56, biasing member 36 functions to bias or push inner shaft 34 outwardly from outer shaft 32, which further moves inner shaft 30 within outer shaft 30 in the same direction, due to the pedal bracket 16 being welded or otherwise secured to the ends 34a, 26a of both inner shafts 34, 26, respectively. Inner shaft 26 and T-handle 28 are thus moved to their unlocked or released position, whereby pedal bracket 16 is moved away from pedals 18 and 20, such that the pedals may then again be depressed and the vehicle thus may be driven.

Therefore, the present invention provides a locking device for retaining the brake and/or clutch pedals of a vehicle in a locked and thus unusable position via a dual locking mechanism. The dual locking mechanism of the present invention substantially precludes the possibility of a potential thief picking or otherwise unlocking the two locks without the appropriate key or keys. The lock cylinders of the dual locking mechanisms may be keyed for the same key or may require a different key, to further reduce the possibility of the locking device being unlocked by a person without the appropriate keys.

The locking device of the present invention is adjustable to adapt to different vehicles, without requiring specially manufactured parts or specially cut lengths of shafts for each different type or make of vehicle. The present invention is adjustable via sliding the mounting collar bracket along the steering column of the subject vehicle until the pedal bracket is positioned at the appropriate location with respect to the pedals in both the locked and unlocked position. The mounting bracket is then clamped to the steering column to prevent further movement therealong, and the locking device is secured in its position in the vehicle. No additional mounting brackets or fasteners are required to secure the locking device of the present invention to the floorboard or other parts of the vehicle. Because the locking device of the present invention is not restricted by the position of the dashboard panel, the locking device may be made to fit most or all models of cars with the same length inner and outer shafts. This provides for improved manufacturing processes and lower cost assemblies, since multiple length parts are not required for various models of locking devices and vehicles.

The present invention also provides for easy locking and unlocking of the locking mechanisms, since the locking process simply requires pulling on the T-handle for the first locking mechanism and pushing against the lock cylinder for the second locking mechanism. Because of the biasing members of the locking device of the present invention, unlocking both locking mechanisms is also easy to accomplish by simply turning the key or keys in each of the two lock cylinders of the dual locking mechanisms. The two biasing members then function to move the respective locking mechanisms to their unlocked positions.

Changes and modifications in the specifically described embodiments may be carried out without departing from the principles of the invention, which is intended to be limited only by the scope of the appended claims, as interpreted according to the principles of patent law.

The embodiments of the invention in which an exclusive property or privilege is claimed are defined as follows:

1. A locking device suitable for securing at least one pedal of a vehicle in a non-operable state, the vehicle having a steering column, said locking device comprising:

a pedal engaging member adaptable to engage the at least one pedal of the vehicle, said pedal engaging member including an inner shaft extending therefrom, said inner shaft being slidably received within an outer shaft of said locking device;

a first locking mechanism movable between a first position, where said pedal engaging member is disengaged from the at least one pedal and movable relative to said outer shaft, and a second position, where said pedal engaging member is engaged with the at least one pedal and secured relative to said outer shaft, said first locking mechanism being adapted to secure the at least one pedal of the vehicle in the non-operable state when in said second position, said first locking mechanism being at least partially within said outer shaft;

a second locking mechanism for securing said first locking mechanism in said second position, said second locking mechanism being movably positioned on said outer shaft, said second locking mechanism being movable to engage said inner shaft of said pedal engaging member to secure said inner shaft relative to said outer shaft; and a mounting member for mounting said locking device to the steering column of the vehicle, said mounting member being configured to be adjustably positioned along the steering column of the vehicle to position said locking device such that said pedal engaging member is positioned remote from the at least one pedal when said first locking mechanism is in said first position.

a mounting member for mounting said locking device to the steering column of the vehicle, said mounting member being configured to be adjustably positioned along the steering column of the vehicle to position said locking device such that said pedal engaging member is positioned remote from the at least one pedal when said first locking mechanism is in said first position.

2. The locking device of claim 1, wherein said mounting member comprises a collar member which is closable around the steering column to secure said locking device to the steering column.

3. The locking device of claim 1 further including a biasing member to bias said pedal engaging member away from the at least one pedal.

4. The locking device of claim 1, wherein said inner shaft includes a handle portion at an end opposite said pedal engaging member, said handle portion being configured such that a user may pull at said handle portion to move said inner shaft and said pedal engaging member relative to said outer shaft and the at least one pedal of the vehicle.

5. The locking device of claim 1, wherein said first locking mechanism further comprises a lock member positioned at least partially within said inner shaft, said lock member being movable to a locking position when said inner shaft is moved a sufficient amount to engage said pedal engaging member with the at least one pedal, said lock member limiting movement of said inner shaft when in said locking position.

6. The locking device of claim 5, wherein said lock member is biased toward said locking position and movable to said locking position when said inner shaft moves to align said lock member with a lock recess positioned along said outer shaft.

7. The locking device of claim 6, wherein said lock member is movable to an unlocking position via an unlocking member interconnected with said lock member, said unlocking member being movable to cause movement of said lock member away from said lock recess and to the unlocking position.

8. The locking device of claim 7, wherein said lock member comprises a lock pin and said unlocking member comprises a rotatable shaft, said rotatable shaft having a cammed engaging portion which engages a recess within said lock pin such that rotation of said rotatable shaft causes translational movement of said lock pin toward said unlocking position.

9. A locking device suitable for securing at least one pedal of a vehicle in a non-operable state, the vehicle having a steering column, said locking device comprising:
    a pedal engaging member adaptable to engage the at least one pedal of the vehicle;
    a first locking mechanism movable between a first position, where said pedal engaging member is disengaged from the at least one pedal, and a second position, where said pedal engaging member is engaged with the at least one pedal, said first locking mechanism being adapted to secure the at least one pedal of the vehicle in the non-operable state when in said second position, said first locking mechanism comprising an outer shaft and an inner shaft, said inner shaft being secured to said pedal engaging member and movable to move said pedal engaging member relative to the at least one pedal of the vehicle, said first locking mechanism further comprises a lock member positioned at least partially within said inner shaft, said lock member being movable to a locking position when said inner shaft is moved a sufficient amount to engage said pedal engaging member with the at least one pedal, said lock member limiting movement of said inner shaft when in said locking position;
    a second locking mechanism for securing said first locking mechanism in said second position, wherein said second locking mechanism comprises a lock pin which is movable to engage openings through respective walls of said inner and outer shafts; and
    a mounting member for mounting said locking device to the steering column of the vehicle, said mounting member being configured to be adjustably positioned along the steering column of the vehicle to position said locking device such that said pedal engaging member is positioned remote from the at least one pedal when said first locking mechanism is in said first position.

10. The locking device of claim 9, wherein said second locking mechanism is movable to position said lock pin at said openings after said inner shaft is moved said sufficient amount.

11. The locking device of claim 10, wherein said lock pin is biased to extend toward said openings and said second locking mechanism is biased to position said lock pin remote from said openings where said lock pin is not aligned with said openings.

12. A locking device suitable for securing at least one pedal of a vehicle in a non-operable state, said locking device comprising:
    a pedal engaging member adaptable to engage the at least one pedal of the vehicle;
    a first locking mechanism comprising an outer shaft and an inner shaft slidable within said outer shaft, said inner shaft being secured to said pedal engaging member and movable between a first position, where said pedal engaging member is disengaged from the at least one pedal, and a second position, where said pedal engaging member is engaged with the at least one pedal, said first locking mechanism including a first locking member which is movable to secure said inner shaft relative to said outer shaft when said inner shaft is in said second position, said inner shaft having an inner opening through a wall of said inner shaft and said outer shaft having an outer opening through a wall of said outer shaft, said inner and outer openings being generally aligned with one another when said inner shaft is in said second position;
    a second locking mechanism for securing said inner shaft in said second position irrespective of said first locking member, said second locking mechanism comprising a second locking member which is positionable at least partially through said outer opening in said outer shaft and said inner opening in said inner shaft when said inner shaft is in said second position; and
    a mounting member for mounting said locking device to the vehicle, said mounting member being configured to mount said locking device to the vehicle to substantially limit movement of said outer shaft relative to the vehicle.

13. The locking device of claim 12, wherein said first locking member is positioned within said inner shaft and is movable to engage a recess positioned along said outer shaft when said inner shaft is in said second position.

14. The locking device of claim 13, wherein said first locking member is biased toward said recess positioned along said outer shaft.

15. The locking device of claim 13, wherein said first locking member is movable in response to rotation of a rotatable shaft positioned within said inner shaft.

16. The locking device of claim 15, wherein said rotatable shaft includes a cammed engaging portion which engages a notch in said first locking member such that rotation of said rotatable shaft causes a corresponding translational movement of said first locking member.

17. The locking device of claim 16, wherein said rotatable shaft is rotatable in response to rotation of a first key at said first locking mechanism.

18. The locking device of claim 17, wherein said second locking mechanism is movable relative to said outer shaft to align said second locking member with said inner opening when said inner shaft is in said second position.

19. The locking device of claim 18, wherein said second locking member is biased toward said inner opening such that movement of said second locking mechanism to align said second locking member with said inner opening results in said second locking member moving to be positioned at least partially through said inner opening.

20. The locking device of claim 19, wherein said second locking mechanism is biased to be positioned such that said second locking member is remote from said inner opening, where said second locking member is not aligned with said inner opening.

21. The locking device of claim 19, wherein said second locking member is movable to retract from said inner opening in response to rotation of a second key at said second locking mechanism.

22. The locking device of claim 12, wherein said second locking mechanism is movable relative to said outer shaft to align said second locking member with said inner opening when said inner shaft is in said second position.

23. The locking device of claim 22, wherein said second locking member is biased toward said inner opening such that movement of said second locking mechanism to align said second locking member with said inner opening results in said second locking member moving to be positioned at least partially through said inner opening.

24. The locking device of claim 23, wherein said second locking mechanism is biased to be positioned such that said second locking member is remote from said inner opening, where said second locking member is not aligned with said inner opening.

25. The locking device of claim 23, wherein said second locking member is movable to retract from said inner opening in response to rotation of a key at said second locking mechanism.

26. The locking device of claim 12, wherein said mounting member is configured to adjustably mount to a steering column of the vehicle.

27. A locking device suitable for securing at least one pedal of a vehicle in a non-operable state, the vehicle having a steering column, said locking device comprising:
    a mounting member for mounting said locking device to the steering column of the vehicle;
    an outer shaft member mounted to said mounting member;
    an inner shaft member movable relative to said outer shaft member, said inner shaft member including a pedal engaging member at an end thereof, said pedal engaging member being movable between an engaging position, where said pedal engaging member is engaged with the at least one pedal, and a disengaging position, where said pedal engaging member is disengaged from the at least one pedal, said inner shaft member including a handle portion at an end opposite said pedal engaging member, said handle portion configured such that a user may pull at said handle portion to move said inner shaft member and said pedal engaging member relative to said outer shaft member to said engaging position:
    a first locking mechanism movable to a first locking position to secure said inner shaft member relative to said outer shaft member when said pedal engaging member is in said engaging position, said first locking mechanism being positioned at least partially within said outer shaft member and being biased to move to said first locking position in response to said pedal engaging member being pulled to said engaging position: and
    a second locking mechanism positioned at least partially outside of said outer shaft member, said second locking mechanism being movable to a second locking position when said pedal engaging member is in said engaging position, said second locking mechanism securing said inner shaft member relative to said outer shaft member when in said second locking position, wherein said second locking mechanism is movable along said outer shaft member between said second locking position and an unlocking position.

28. The locking device of claim 27, wherein said mounting member is configured to be adjustably positioned along the steering column of the vehicle to position said locking device such that said pedal engaging member is positioned remote from the at least one pedal when said pedal engaging member is in said disengaging position.

29. The locking device of claim 27 including a biasing member which biases said pedal engaging member toward said disengaging position.

30. The locking device of claim 27, wherein said first locking mechanism is positioned at least partially within said inner shaft member.

31. The locking device of claim 30, wherein said first locking mechanism is movable to said first locking position when said inner shaft member moves to align a first locking member of said first locking mechanism with a lock recess positioned along said outer shaft member.

32. The locking device of claim 27, wherein said second locking mechanism is biased toward said unlocking position.

33. The locking device of claim 32, wherein said second locking mechanism includes a locking member which is movable to engage said inner shaft member through an opening though a wall of said outer shaft member when said second locking mechanism is moved to said second locking position.

34. The locking device of claim 33, wherein said opening in said wall of said outer shaft member is generally aligned with an opening in a wall of said inner shaft member when said pedal engaging member is in said engaging position.

35. The locking device of claim 33, wherein said second locking mechanism comprises a movable locking actuator which is manually movable along said outer shaft member by the user to cause said locking member to move to engage said inner shaft member.

36. The locking device of claim 27, wherein said handle portion includes an unlocking device of said first locking mechanism, said unlocking device being operable to unlock said first locking mechanism.

* * * * *